United States Patent [19]

Matsubara

[11] 4,359,988

[45] Nov. 23, 1982

[54] IGNITION TIMING REGULATING APPARATUS

[75] Inventor: Yuji Matsubara, Yokohama, Japan

[73] Assignee: Nissan Motor Company, Limited, Yokohama, Japan

[21] Appl. No.: 120,098

[22] Filed: Feb. 11, 1980

[30] Foreign Application Priority Data

Feb. 16, 1979 [JP] Japan ................................ 54/16976

[51] Int. Cl.[3] ................................................ F02P 5/04

[52] U.S. Cl. .................................... 123/424; 123/609; 123/417

[58] Field of Search ............... 123/117 D, 118 R, 417, 123/424, 609

[56] References Cited

U.S. PATENT DOCUMENTS

| | | | |
|---|---|---|---|
| 3,901,201 | 8/1975 | Mizuguchi | 123/117 D |
| 4,099,495 | 7/1978 | Klencke | 123/117 D |
| 4,138,977 | 2/1979 | Grather | 123/117 D |
| 4,174,688 | 11/1979 | Honig | 123/117 D |
| 4,178,893 | 12/1979 | Aoki | 123/117 D |
| 4,198,941 | 4/1980 | Oishi | 123/117 D |

*Primary Examiner*—Ronald B. Cox

*Attorney, Agent, or Firm*—Lowe, King, Price & Becker

[57] ABSTRACT

Ignition timing is controlled to provide a fixed advanced timing based on a standard angle signal derived from a standard angle sensor during low engine running speeds such as starting and idling engine timing advance is varied during higher running speeds based on a time duration elapsing from the timing of the standard angle signal derived from the sensor thereby, engine starting performance and idling stability are substantially improved.

3 Claims, 4 Drawing Figures

START
Starting SW
ON
OFF
Throttle Valve
Full-Opening SW
ON
OFF
Revolution Speed
Read-In
Intake Negative
Pressure Read-In
N-Table
Look-up
N-Reading
into Registor
120 Degree Signal
Detection
NO
NO
Timing Pulse
Detection
YES
N=N-1
NO
N=0
YES
Ignition
RETURN
120 Degree
Signal Detection
NO
YES
Ignition
RETURN

IGNITION TIMING REGULATING APPARATUS

BACKGROUND OF THE INVENTION (1) Field of the Invention

The present invention relates to an improved ignition timing regulating apparatus for an internal combustion engine.

(2) Description of the Prior Art

To match the ignition timing of an internal combustion engine accurately to required engine performance, various kinds of electronically controlled apparatus for regulating ignition timing have been developed, in which a micro-computer is employed in place of a mechanically controlled device for regulating the advancing angle of ignition timing, or engine timing advance.

For example, a table of various time durations converted respectively from optimum ignition timing, these amounts correspond respectively to various operating conditions of the engine, for instance, the number of revolutions per unit time and the intake negative, is stored in the form of a pulse train, that is, a number of pulses representing the time duration, based on the fact that the advancing angle of ignition timing corresponds to the time duration elapsing from the timing of a standard engine angle. The advance angle corresponds to an operating condition of the engine, for instance, the number of revolutions per unit time (rpm), which is detected occasionally. A standard angle sensor is provided for deriving a standard angle signal at a predetermined angle of revolution of a crank, for instance, at every angle of 120 degress corresponding to the phase difference of ignition timing between each cylinder of a six cylinder engine. Thus, each time the standard angle signal is derived, the time duration representing the optimum ignition advance angle which corresponds to the occasionally detected operating condition of the engine, can be read out from the table, and when the time duration elapsing from the timing of the standard angle coincides with the above read out time duration, an igniting signal can be obtained.

According to the above example, the obtained optimum ignition timing advance angle corresponds to only the time duration elapsing from the timing of the standard angle which is responsive to the operating condition of the engine. Thus, it is occasionally not required to detect the crank angle precisely, and it is therefore possible to simplify the crank angle sensor for detecting the crank angle.

However, on the other hand, the above exemplified apparatus has such a defect that, until the number of revolutions per unit time, that is, the speed of revolution (rpm) of the engine can be detected, it is impossible at the starting of the engine, for instance, during engine cranking to determine the ignition timing at which the ignition should be carried out.

Thus, since detection of the speed of revolution can be performed by counting the time duration between successive timings of the aforesaid standard angle, the initial data relating to the speed of revolution cannot be obtained, until at least two of the aforesaid standard angle signals are derived from the standard angle sensor in response to one third of a revolution of the crank shaft. Initial ignition is thus apt to be unattainable during engine cranking, and as a result thereof the starting performance of the engine is deteriorated.

Further, the time duration, that is, the number of pulses of the pulse train to be counted each pulse represents the is increased during low engine speed in comparison with high engine speed, so that the number of bits of the data to be operated in the micro computer employed in the apparatus is increased with substantial disadvantage.

SUMMARY OF THE INVENTION

An object of the present invention is to provide an ignition timing regulating apparatus in which the starting performance of the internal combustion engine and the idling stability are substantially improved.

The feature of the ignition timing regulating apparatus according to the present invention is that ignition is effected at a fixed timing advance synchronized to a standard angle signal derived from a standard angle sensor during the low speed of revolution of the engine at starting and idling, while at normal running speech, ignition is effected at variable timing advance synchronized to the standard angle signal derived from the sensor.

The present invention will be explained in detail regarding the preferred embodiments hereinafter by referring to the accompanied drawings.

DESCRIPTION OF THE PREFERRED EMBODIMENTS

Figure 1:
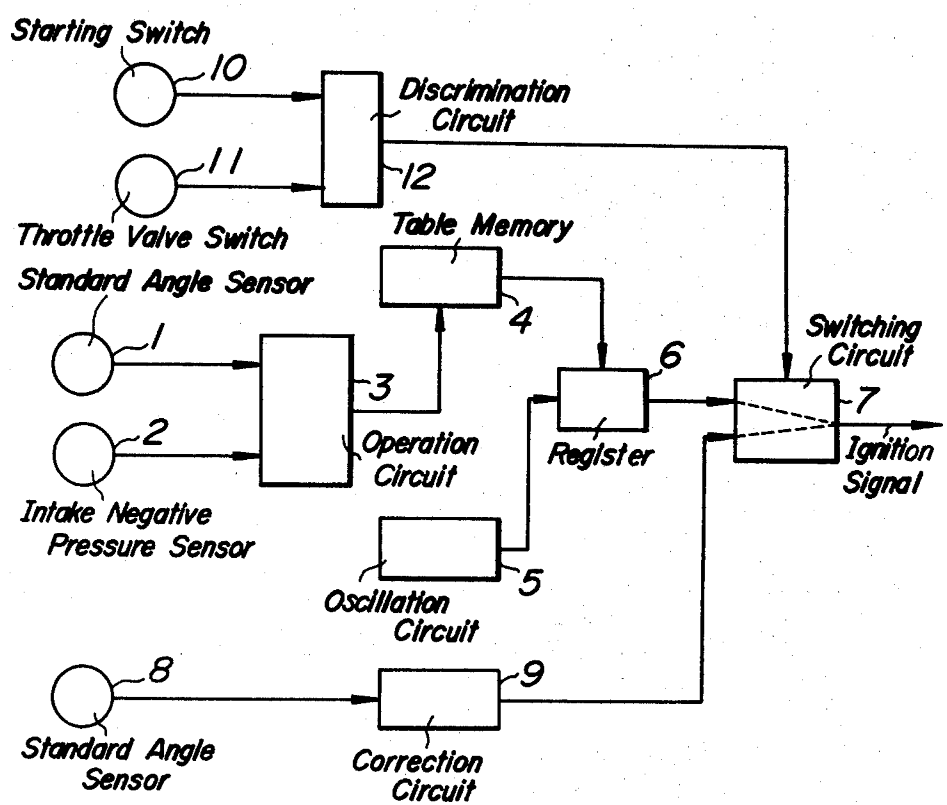
FIG. 1 is a block diagram showing a preferred embodiment of the present invention.

Referring to FIG. 1, an embodiment of the ignition timing regulating apparatus according to the present invention in which ignition timing for a four cycle six cylinder engine is controlled electronically is shown. In this embodiment, 1 denotes a standard angle sensor from which a standard angle signal (a) is derived at each of a member of predetermined angles of revolution of the crank shaft in such a manner that, for instance, one pulse is derived at a position of 70 degrees advancing against the respective top dead center of each cylinder at every angle of 120 degrees of revolution of the shaft.

2 denotes an intake negative pressure sensor for detecting the intake negative pressure of the internal combustion engine, and 4 denotes an operation circuit in which the number of revolutions per unit time (rpm) of the engine is calculated from a standard angle signal (b) based on the phase difference between two standard angle signals prior to the present calculation, and further an output signal corresponding to an engine operating condition obtained from the above calculated number of revolutions (rpm) and the intake negative pressure detected by the intake negative pressure sensor 2 is applied to a table memory 4.

The table memory 4 is a table of various time durations converted respectively from optimum ignition timing corresponding to various combinations of the numbers of revolutions and the intake negative pressures. The time duration stored in the table are in the form of various lengths of pulse trains, that is, various numbers of pulses obtained by counting a reference clock pulse train. The train length is developed from various angles between the positions of required advancing angles and those at which the standard angle signals (b) are generated stored therein.

The number of pulses derived from the table memory 4 in response to the above applied output signal is applied to a register 6, to which the aforesaid reference clock pulse train is applied from an oscillation circuit 5. Accordingly, in the register 6, the count-down of the reference clock pulse is started at the time when the standard angle signal (b) is generated. At the timing when the result of the above count-down of the reference clock pulse coincides with the number of pulses derived from the table memory 4, the ignition signal is derived from the register 6, and applied to an ignition device (not shown) through a switching circuit 7, so as to effect the ignition for the internal combustion engine.

A substitute standard angle sensor 8 is employed in the ignition timing regulating apparatus shown in FIG. 1 in addition to the above mentioned sensor 1.

This substitute sensor 8 is provided for deriving the standard angle signal (a) based on the detection of a position of 10 degrees advanced against the respective top dead center of each cylinder at every angle of 120 degrees of crank shaft revolution. This position is selected as the required advancing angle during idling of the engine, so as to be quite different from the aforesaid position of 70 degrees advancing for ordinary engine running.

The above standard angle signal (a) is applied to a correction circuit 9 which is provided for correcting the signal (a), so as to form a substitute ignition signal used for engine idling, which ignition signal is also taken out through the switching circuit 7.

The switching circuit 7 is provided for switching the above mentioned two kinds of ignition signals in such a manner that, during cranking or idling of the engine, the substitute ignition signal derived from the correction circuit 9 is applied to the engine, while, in the ordinary condition of operation except for the above case, the ignition signal derived from the register 6 is applied to the engine.

For achieving the above mentioned manner of switching, the switching circuit 7 is controlled by a discrimination output signal of a discrimination circuit 12 formed of an OR circuit for discriminating whether a starting switch 10, which is closed during the operation of a starter motor, or a throttle valve switch 11, which is closed during the full closing of an intake throttle valve, is closed, and further whether both of those switches are closed simultaneously or not, so as to apply the substitute ignition signal derived from the correction circuit 9 to the engine during the operation of the starter motor or the full closing of the intake throttle valve.

Figure 2:
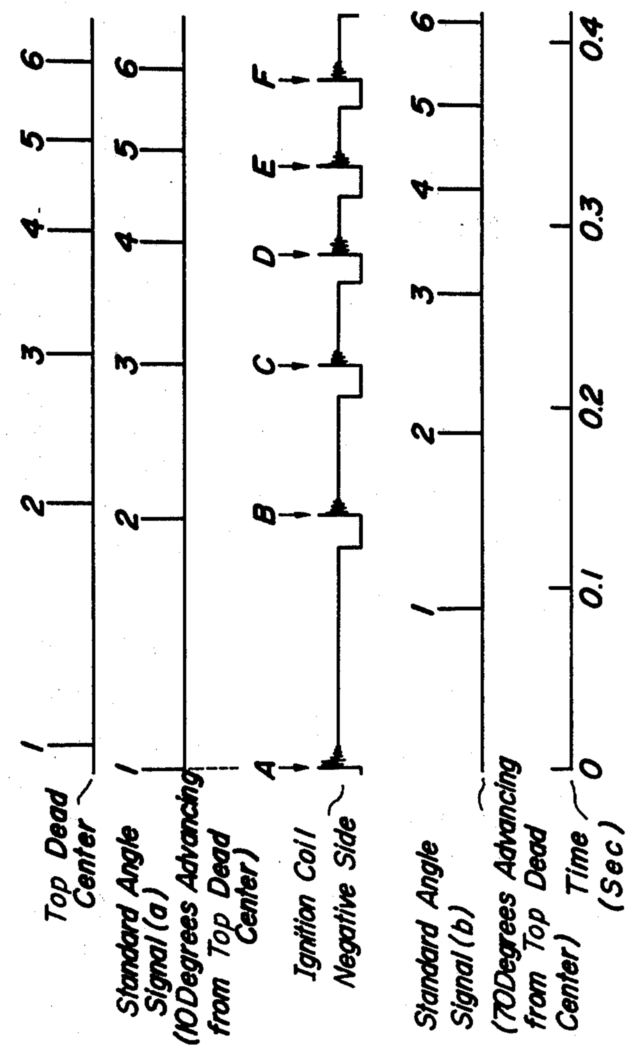
FIG. 2 is a time chart showing the operation of the embodiment shown in FIG. 1.

FIG. 2 is a time chart showing the process of the above mentioned selective application of the igniting signals to the engine.

According to the above time chart, during starting or idling of the engine, the ignition is effected at the fixed timing positions based on the standard angle signal (a), which positions are denoted by A, B and C.

A primary coil of the ignition device is energized, so as to make it ready to ignite the engine, when an engine switch is already closed. Each time current through the primary coil is cut off in response to the application of the substitute ignition signal based on the standard angle signal (a), the engine is ignited.

Thereafter, when starting has been performed and an accelerator pedal is depressed so as to open the intake throttle valve gradually, the optimum amount of the advancing angle corresponding to the present condition of operation, that is, the number of revolutions and the intake netative pressure, is selected by referring to the standard angle signal. The ignition signal formed by counting the time duration based thereon in the register 6 is applied to the engine through the switching circuit 7, so as to ignite the engine at the timing positions denoted by D, E and F in FIG. 2.

Figure 3:
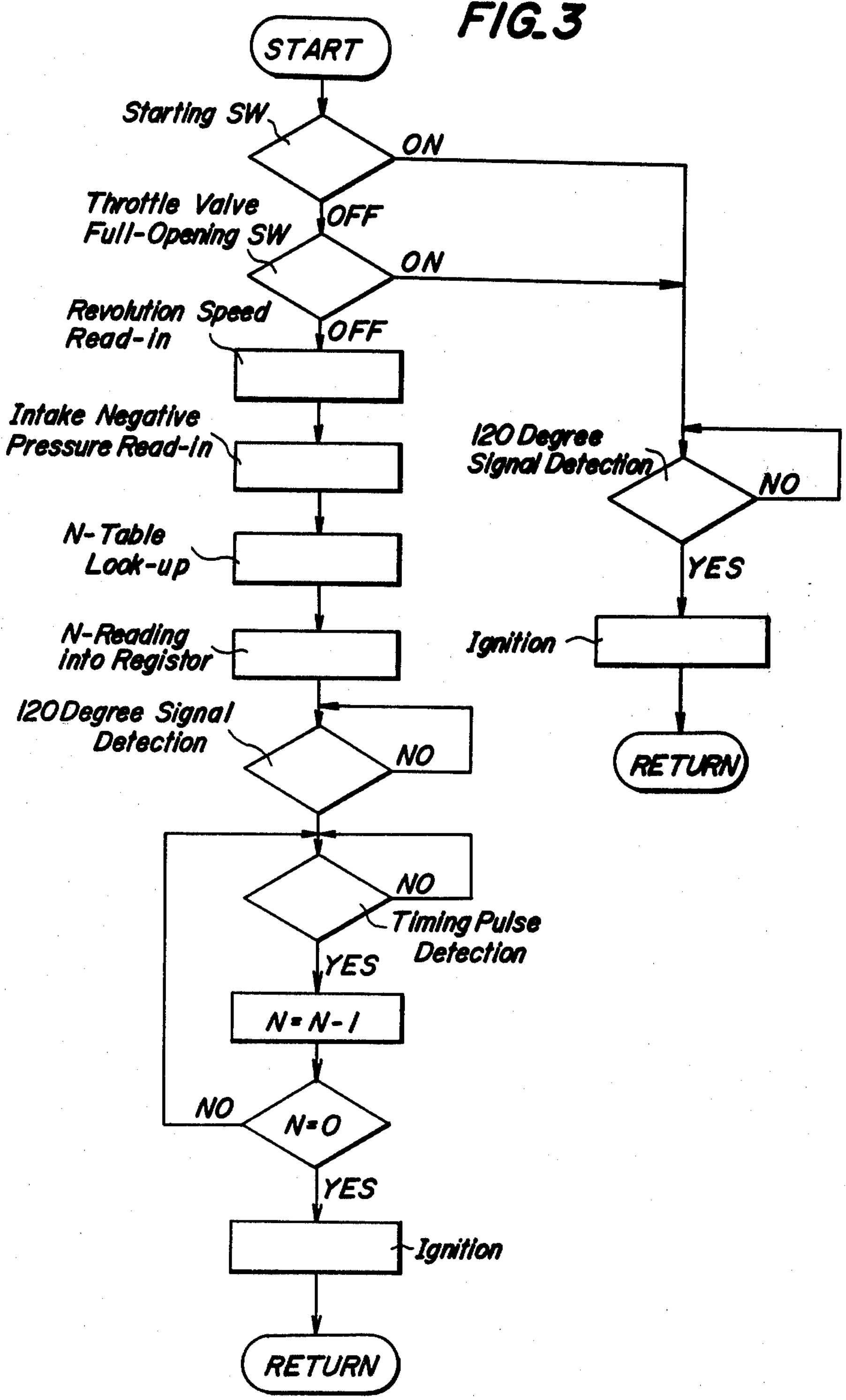
FIG. 3 is a flow chart showing the operation of another preferred embodiment of the present invention employing a micro computer.

FIG. 3 is a flow chart showing the procedure of the above mentioned selective application of the igniting signals to the engine, which procedure is performed according to the operation carried out by a micro computer employed by the ignition timing regulating apparatus of the present invention.

According to the above flow-chart, when at least one of the starting switch and the throttle valve switch is closed, the procedure is performed according to routine for the fixed ignition timing, which is shown on the right half of FIG. 3, so as to settle the ignition timing on the positions based on the standard angle signal (a).

On the other hand, when both of the switches are opened, the procedure is performed according to the routine for variable ignition timing, which is shown on the left half of FIG. 3, according to which routine the ignition timing is varied in response to a condition of operation of the engine, so that the ignition timing is controlled by counting the time duration elapsing from the timing position based on the standard angle signal (b).

Accordingly, the optimum amount of timing advance corresponding to the present condition of operation, that is, the engine rpm and the intake negative pressure, read out from the table memory 4 in the form of pulse train length, that is, the number N of pulses thereof corresponding to the time duration elapsing from the timing position based on the standard angle signal (b) to the required practical ignition timing, is applied to the register 6, wherein the number N of pulses is counted down to a number N-1 every time the clock pulse is applied from the oscillation circuit 5, so as to derive the igniting signal therefrom, when the above number N of pulses reaches to zero, that is, $N=0$.

Figure 4:
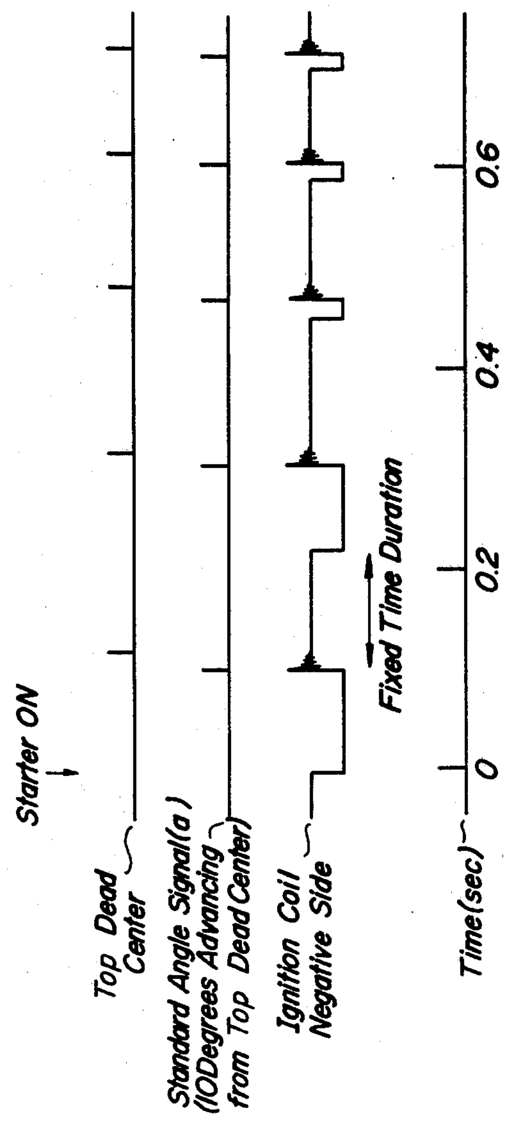
FIG. 4 is a time chart showing the dwelling operation for the primary ignition coil.

Next, the procedure of the control of the energizing time, that is, the dwell time for the primary coil of the igniting device in case of the fixed ignition timing will be explained hereinafter by referring to the time chart shown in FIG. 4.

At first, at the same time that the starter motor is driven, the energization of the primary coil of the igniting device is started, and then the ignition is effected by cutting off the current passing therethrough at the timing position based on the standard angle signal (a).

The next energization is started after a fixed time duration, for instance, 0.1 second elapsed from the first ignition. Regarding the sequential ignitions effected the third time and so on, the instantaneous speed of revolution can be detected by referring to the time duration between the preceding two ignitions which is based on the standard angle signal (a). Thus the energizing of the primary coil can be controlled by determining the time duration elapsing from the timing position based on the standard angle signal (a) so as to obtain the minimum time length, for instance, 0.5 milli second, required for energizing the primary coil.

Apparently from the explained above, the various advantages can be obtained according to the present invention as follows.

Firstly, the starting performance of the engine is improved substantially, since the initial ignition can be attained easily and securely with response to the initial application of the standard angle signal caused by the cranking of the engine.

Secondly, it is possible to stabilize the performance of operation to a large extent on account of the first ignition timing during low running speed including the cranking of the engine.

Thirdly, the substantial increase of the counted number for the time duration as in the conventional apparatus of the aforesaid time division system is avoided caused, so that the troublesome overflow does not occur at all in the micro computer employed in the apparatus.

In addition thereto, although two standard angle sensors are employed in the above mentioned embodiment of the present invention for obtaining two kinds of standard angle signals (a) and (b), it is possible to simplify the apparatus by using a standard angle signal derived from a single sensor for those two kinds. However, such a benefit can be obtained in case of two kinds of sensors employed that respective optimum timing positions for the standard angle signals corresponding respectively to the occasional conditions of operation of the engine can be used for regulating the ignition timing accompanied with minimized deviations such as a delayed response which are caused frequently by such a transient condition as acceleration.

What is claimed is:

1. An internal combustion engine ignition timing regulating apparatus provided with a standard angle sensor for detecting a predetermined standard angle which is advanced ahead of a top dead center of a crank angle and in response generating standard angle signals, a memory means having stored therein optimum timing advance angle data corresponding to running conditions of the engine, the stored data being representative of signals displaced in time from and synchronized to timing of the standard angle signals, and a register means for deriving an ignition signal to be applied to an ignition device of the engine at a time corresponding to the read out time duration elapsing from a time of an immediately previously generated standard angle signal, said read out time duration corresponding to a speed of revolution determined in accordance with at least two standard angle signals generated prior to the immediately previously generated standard angle signal, the timing regulating apparatus comprising:

- a discriminator means for discriminating starting of an internal combustion engine, and
- a switching means for applying a substitute ignition signal to the ignition device at a fixed timing advance angle synchronized to the standard angle signal during starting of the engine discriminated by said discriminating means, said ignition device being energized a first time simultaneously with start of a starter motor, a second time after a fixed time duration following ignition, and thereafter synchronously with and at a time duration following said standard angle signal, said time duration depending upon instantaneous speed of revolution of said engine.

2. An ignition timing regulating apparatus as claimed in claim 1, further comprising:

- a substitute standard angle sensor for detecting a fixed standard angle which is different from said predetermined standard angle to form said substitute ignition signal.

3. An ignition timing regulating apparatus as claimed in claim 1, wherein said discriminator means is responsive to closing of at least either one of a starting switch and a throttle switch of the engine to identify engine starting.

* * * * *